Aug. 24, 1954     J. M. D. REGINA     2,687,077
INFUSION DEVICE

Filed June 25, 1951     3 Sheets-Sheet 1

INVENTOR
Jose Maria Domingo Regina
BY Stowell & Evans
ATTORNEYS

INVENTOR
Jose Maria Domingo Regina
BY Stowell + Evans
ATTORNEYS

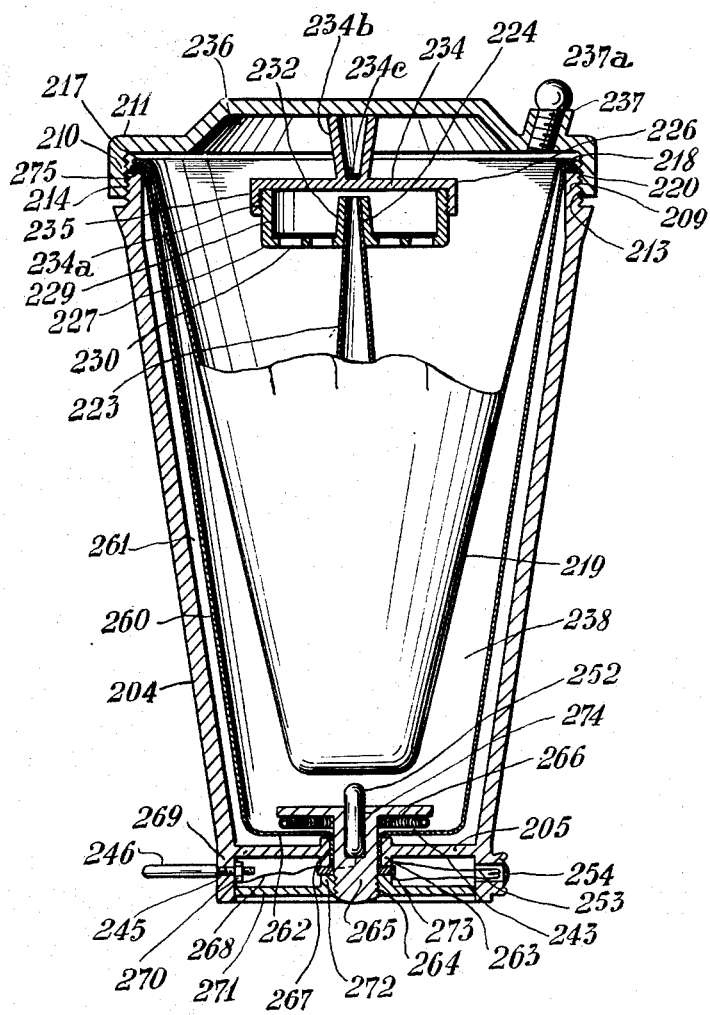

Patented Aug. 24, 1954

2,687,077

UNITED STATES PATENT OFFICE 2,687,077

INFUSION DEVICE

José Maria Domingo Regina, Villa Elisa, Argentina

Application June 25, 1951, Serial No. 233,335

6 Claims. (Cl. 99—313)

1

The present invention relates to infusion devices of the kind used for preparing infusions of beverages such as coffee and tea, and more particularly to a device which can be used not only for preparing straight infusions but also for preparing diluent mixed infusions and in which the diluent is preheated at the same time as the extractant.

It is therefore a principal object of the present invention to provide an infusion device of the type described which shall be of simplified construction and shall comprise a highly efficient combination of parts operative in the preparing of said infusions.

A further object of the invention is to provide an infusion device comprising an outer container for the extractant, an inner container for the extract, means for containing the substance to be extracted, means for conducting the extractant to said substance, and a single closure and locking means whereby the outer container may be closed and the other parts firmly held in operative relationship therewithin.

Another object of the present invention is to provide an infusion device of the type described in which the inner container shall be so related to the outer container and the other operative parts as readily to permit the preheating therein, simultaneously with the heating of the extractant in the outer container, of a diluent, such as milk, to which the extract is automatically admixed as it is formed.

Another object of the invention is to provide an infusion device of the type described in which the parts contained in the outer container may be readily removed to enable the outer container to be employed for other purposes.

A further object of the present invention is to provide an infusion device of the type described in which the outer container and the lid define together a housing which may be used by itself for simply containing and/or heating and pouring liquids and in which the inner container may be entirely enclosed.

Yet another object of the present invention is to provide an infusion device of the type described in which the inner container shall be suspended in the outer container and the lid shall be adapted to transmit to the area of suspension sufficient pressure to provide a substantially gas-tight seal over said area.

Another object of the present invention is to provide an infusion device of the type described in which the lid and outer container shall together define a substantially closed housing in

2 which the inner container is suspended and entirely enclosed and which shall have passage means establishing communication, as for pouring, between the inner container and the atmosphere.

These and other objects and advantages of the present invention will become more clearly apparent in the course of the following detailed description of certain preferred embodiments thereof which, by way of example, have been illustrated in the accompanying drawings.

In the drawings:

Fig. 4 shows another modified embodiment of the device, partly in section, and

Figure 1:
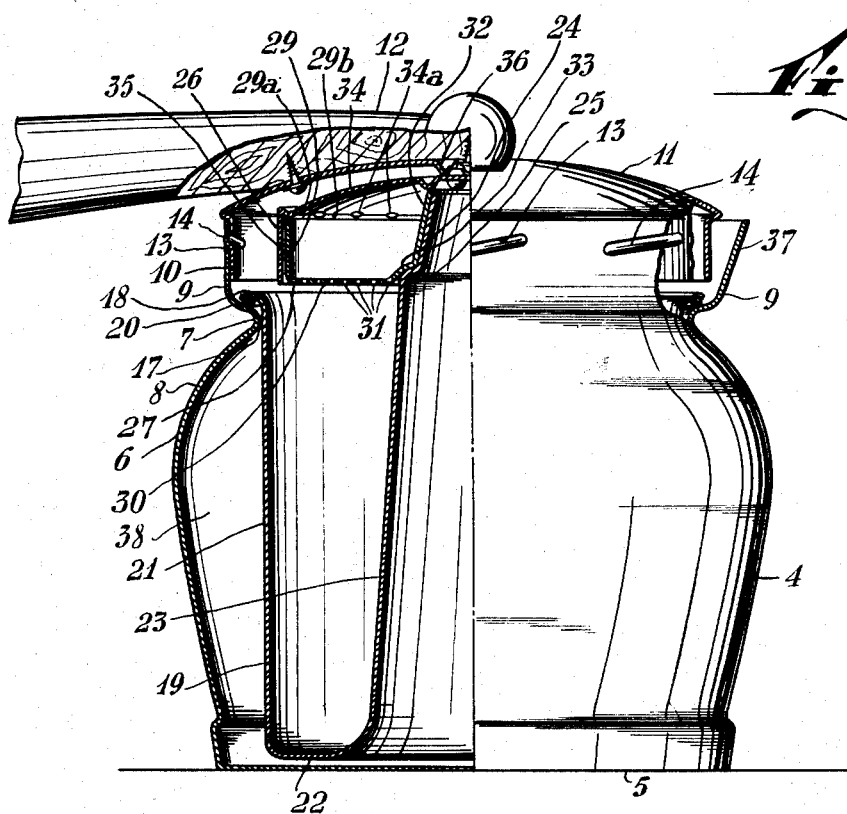
Fig. 1 is a part sectional elevation of an infusion device according to the present invention.

Referring first to Fig. 1, the infusion device there shown comprises an outer container 4 for the extractant, which will normally be water, said container having a substantially flat bottom 5, a peripheral wall 6 which preferably tapers downwardly to the bottom 5 from the neighborhood of a constricted neck portion 7, between which and the tapering part of the wall 6 I may provide an outwardly directed bulge 8 so as to increase the capacity of the outer container. Beyond the neck portion 7 is a substantially cylindrical upper wall portion 9 adapted to receive a depending skirt portion 10 of a dished or domed lid 11 on the outside of which is affixed a handle 12. The upper wall portion 9 is formed to provide elongated inclined slots 13, adapted to cooperate with quick thread portions 14, formed at suitable intervals on the outside of said skirt portion 10 to provide a means for readily and securely locking and unlocking said cover 11 with respect to the outer container 4.

Figure 2:
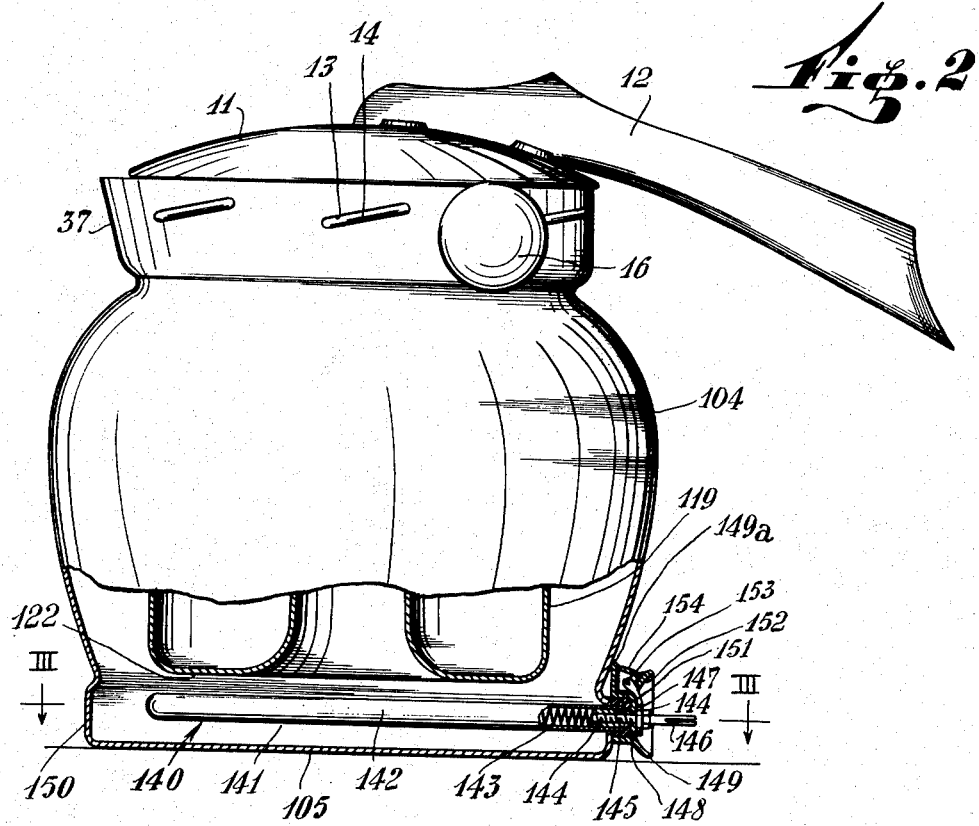
Fig. 2 is a part sectional elevation of a somewhat modified embodiment of my novel infusion device illustrated with built in electrical heating means.

For convenience, and as indicated in Fig. 2, I may provide on the outside of said upper wall 9 one or more pairs of symmetrically disposed knobs 16 to enable the infusion device to be more readily and securely transported, say from one room to another, when in use, and to afford a gripping place for holding the outer container when securing or unlocking the lid 11. Hence, I prefer to make said knobs, and of course the handle 12, of thermally insulating material, such as wood or plastics.

On the inside of the outer container 4, said constricted neck 7 forms an annular shelf or ledge 17, adapted to serve as a support for an outwardly directed flange 18 defining the open end of an inner container 19, between which flange and said shelf 17 I prefer to provide a compressible packing member, such as rubber ring 20, in order to secure as gastight a joint as possible, when the device is assembled.

The inner container 19 is of generally cylindrical form, comprising a surrounding wall 21, and an annular floor 22, from the inner portion of which a tubular duct 23 extends towards and preferably beyond the open end defined by the flange 18. Preferably, said duct 23 is slightly conical also preferably the free end portion 24 thereof lying outside the inner container 19 is more pronouncedly conical and has a large end adjacent the duct and of smaller diameter than the small end of the duct with which said large end merges so that at a level preferably just outside said inner container, a shoulder 25 is formed, for a purpose to be hereinafter made clear.

It will be observed that the lid 11 and the outer container 4 together define a substantially closed housing and it is a feature of the present invention that the inner container 19 including all its constituent parts, is wholly enclosed in said housing. Hence since the inner container 19 is to be suspended by engagement of the outwardly directed flange 18 with the ledge or annular supporting surface 17 or with the packing member 20 resting thereon, said annular supporting surface must likewise be contained within said housing. Moreover, as one of the principal functions of the lid 11 is to transmit pressure to the joint between flange 18 and annular supporting surface 17, said surface must also be associated constructively with the outer container 4.

The means for containing the extractable substance comprises a cap member 26 and a reservoir member 27 adapted to be mounted on said free end portion 24 of duct 23. For this purpose, the reservoir member comprises a side wall 29, an annular foraminous end wall 30 having a plurality of fine holes 31 and adapted to act as a filter or strainer, and a hollow supporting portion 32, here shown as frustoconical in shape, extending from said foraminous wall 30 on the same side thereof as the side wall 29 and adapted to receive said free end portion 24. Between said conical supporting portion 32 and the foraminous wall 30 I may provide a step 33 adapted to cooperate with the shoulder 25 of the end portion 24 of duct 23, to prevent such intimate engagement between the supporting portion 32 and the free end portion 24 as might cause binding therebetween. I prefer to proportion the parts in such a manner that when the supporting portion 32 is fitted thimble like over the end portion 24, the extremity of the supporting portion is on a level with or a little below the extremity of said end portion 24.

The cap member 26 comprises an imperforate, preferably outwardly dished or domed top 34 and depending imperforate side wall 35 of diameter such as to be an easy fit over the side wall 29 of the reservoir 27.

As will be more clearly pointed out hereinbelow, it is not essential to one of the principal features of the present invention namely to obtaining a gastight joint over the area of suspension of the inner container, that is to say between the flange 18 and the supporting surface 17, both of which should be continuous, that a cap member such as member 26 be provided.

Furthermore, when such cap member is provided it may be constructed in any desired manner provided that when assembled to the reservoir 27 vapor and hot extractant may enter the reservoir from the free end portion of the duct 23 and that vapors may escape from the combination of cap member and reservoir. Thus the cap member may comprise merely a deflecting member such as the imperforate top 34 without any depending side wall.

However, if hot vapors are allowed to escape freely, they will naturally tend to flow towards the lid 11 and will not flow towards the inner container 21. Moreover, the extraction will then be carried out practically entirely by gravity flow of the hot extractant through the material to be extracted, which gives a rather weak infusion. On the other hand, if the joint between the outer margin and/or side wall of the cap member 26 and the side wall of the reservoir 27 be made substantially tight, vapor pressure will build up in the means for containing the extractable substance and over said substance and the extraction will take place under pressure while such arrangements have heretofore been proposed, they suffer from the drawback that the vapor pressure tends to compact the usually comminuted or granular substance so as to render the passage of the extractant very difficult.

Hence I prefer to use a cap member and to provide means for determining a retarded but escape of the vapors whereby extraction takes place by gravity assisted by some pressure and some turbulence, whereby the extractable material not only is not compacted but is agitated to some degree and thus more intimately contacted with the extractant.

In addition, I prefer to provide the overlapping side wall construction somewhat as indicated, in order to direct the escaping vapors away from the lid and into the inner container 21 to assist in preheating said container and in preheating or maintaining the temperature of its contents. Hence in the embodiment illustrated in Fig. 1, I provide at the central portion of the top 34, contact surfaces such as a plurality of preferably symmetrically disposed protuberances 36 extending in the same direction as the depending side wall 35, so disposed as to engage the extremity of the conical supporting portion 32 when the parts are in assembled condition. In this embodiment the parts are so shaped and proportioned that when the reservoir 27 has been seated on said end portion 24 and the cap member 26 positioned over the reservoir, the lid 11, when in locked position, will exert pressure on the central portion of the cap member to thereby urge the protuberances against the extremity of the supporting portion 32 and hence, indirectly to urge the flange 18 of the inner container 19 towards the shelf 17 and thus to compress the gasket or packing 20 and thereby provide a substantially gastight seal between the inner and the outer containers.

To render possible the slow and directed escape of vapors from the space between the cap member 26 and the reservoir 27, I provide between the cap member 26 and the reservoir 27 spacer means. To this end I may, as shown in Fig. 1, provide a plurality of protuberances 34a peripherally spaced about the marginal portion of the top 34 which would be above the free edge 29a of the side wall 29 of reservoir 27 and adjacent the depending wall 35, said protuberances being designed to rest on said free edge 29a and to define therewith spaced narrow gaps or vents 29b for the controlled passage of vapors.

The relationship between the two side wall portions 29 and 35 are such as to provide for a slow passage of vapors therebetween. For instance they may be screwed lightly together by providing a suitable leaking thread construction of any conventional type (see, for example, Figs. 4 and 5) or the adjacent faces of said side walls may be spaced a short distance apart as shown or they may be fluted or otherwise suitably designed.

Also in order that the escaping vapors may be positively directed into the inner container, I prefer, as shown to make the depending side wall long enough to terminate at about the level of the foraminous end wall 30.

It should also be noted that I may provide the protuberances 34a on the side wall of the reservoir 27, as by serrating or notching the free edge 29a or, I may locate the spacer means between said side walls, as in the case of the use of a screw thread.

It should be noted that the length of the surrounding wall 21 of the inner container 19 is such that the annular floor 22 will be spaced a short distance from the bottom 5 of the outer container.

In order to be able to pour out the prepared infusion without being compelled to dismantle the device, I provide at a convenient point of the upper wall 9 of said outer container, passage means such a spout or discharging lip 37 which, as can readily be appreciated from Fig. 1, does not in any way affect the closure of the space for extractant between the inner and outer containers and yet establishes a sufficient communication between the inner container and the atmosphere to allow of pouring out of the contents. Also it will be observed that the relatively narrow passage communicating with the outside atmosphere thus provided detracts but a negligible amount from the effectiveness of the device as a whole to maintain the temperature of the prepared infusion at approximately the temperature of infusion for a considerable period, since the main factor in the heat conservation is to be found in the vapor space 38 surrounding the wall 21 and floor 22 of the inner container, which space is wide over practically the whole extent of the axial dimensions of the inner container, where radiation and conduction losses are most likely to take place.

It should also be noted that the space between the lid 11 and the flange 18 of the inner container, as well as the major portion of the duct 23, is, during the preparation of the infusion and for some time thereafter filled with hot vapors, which not only assist in maintaining the temperature of the prepared infusion, but also conduce to a rapid heating of the inner container from the space 38, the inside of duct 23, and through the vapors issuing from the means for containing extractable material. This feature is of considerable importance when the device is used for preparing an infusion admixed with a diluent such as milk, which requires preheating, because in my device, the arrangements permit of the preheating in the same apparatus of the diluent simultaneously with the heating of the extractant and to substantially the same temperature, whereby I not only avoid having to use a separate vessel for heating the diluent but there is practically no loss of temperature when the infusion is admixed to the diluent.

Figure 3:
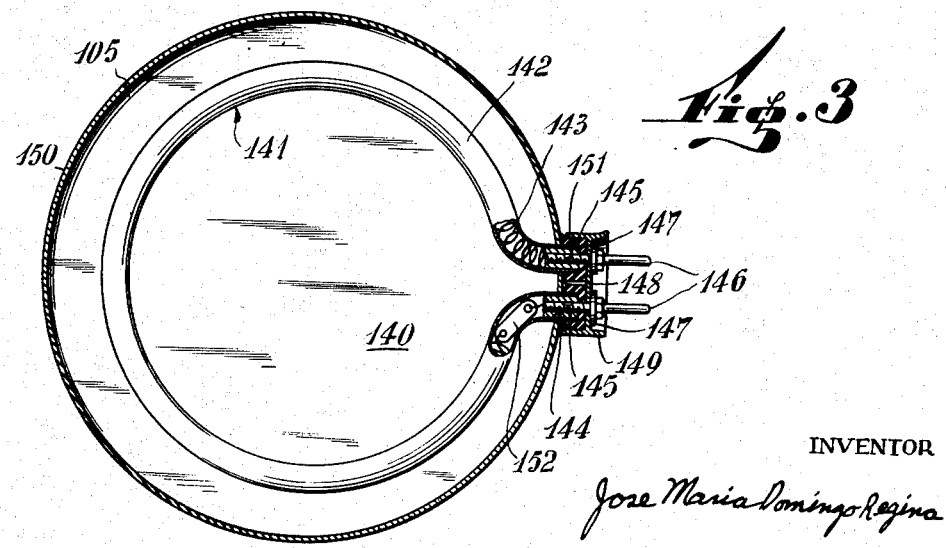
Fig. 3 is a section along the line III—III of Fig. 2.

In Figs. 2 and 3 I have illustrated a slightly modified form of my novel infusion device, which is there shown as provided with a built-in electric heater and certain useful ancillary devices.

As shown in Fig. 2, between the annular floor 122 of the inner container 119 and the bottom 105 of the outer container 104, I provide an electric heater indicated by the general reference character 140, comprising as best seen in Fig. 3 an annularly bent tubular heating element 141 including a tubular jacket 142 of glass and a helical resistance or heating element 143 the turns of which are in contact with the inner surface of jacket 142. The ends of the jacket are closed by metal plugs 144 drilled and tapped to receive screwthreaded shanks 145 of contact pins 146 which preferably have a stop pin 147 intermediate their ends adapted to engage an inner transverse wall 148 of a terminal housing 149 of electrically insulating material mounted on the outside of the outer container at a level between said floor 122 and said bottom 105, and against a substantially cylindrical wall portion 150 (Fig. 2) between which and said housing 149 I provide around the projecting ends of the heating element 143, a seal 151 of suitable heat resisting material.

Referring again to the heating element 143, I provide inside the jacket 142 thereof and near one end, a thermostat device 152 designed to break the heater circuit when the temperature of the element reaches a predetermined value.

The terminal housing 149 preferably includes an off-set wall portion 149a (see Fig. 2) defining a cavity 155 in which visual signal means may be installed. Such visual signal may be a small glow wire 153 installed in back of and protected by a lens 154 and adapted to glow when the heater is on and to be cut out when the thermostat 152 operates, to cut out the heater.

Considering now Fig. 4, the embodiment therein shown differs in some respects from both of the embodiments shown in Figs. 1 and 2. Thus the outer container 204 is of generally frustoconical shape and has a cylindrical upper wall 209 having an ordinary screw thread 213 formed on the outside thereof, adapted to cooperate with a female thread 214 formed on the inside of the depending skirt portion 210 of cover 211. The annular supporting surface for the flange 218 of inner container 219, is provided by the upper free edge 217 of the cylindrical upper wall 214. Moreover, between the inner and outer containers, I provide a liner 260, preferably of metal and spaced somewhat from the inner surface of the outer container 204 to provide an insulating air space 261. Said liner 260 has an annular outwardly turned lip 275 adapted to fit between said upper free edge 217 and the annular flange 218 and an annular bottom wall 262 which is also spaced from the bottom 205 of the outer container, said bottom having anchoring means comprising for instance a centrally disposed, tubular supporting member 263, the ends of which project from either side of said bottom 205, said tubular supporting member being adapted to receive a closely fitting stem 265 of a disc shape heater holder 266, between which stem 265 and the tubular support, a tubular projection 267 of liner 260 may be gripped, so that said liner is positively secured at each end thereof.

The heater holder, in the assembled condition of the parts, lies on the same side of the liner as the inner container 219, and has mounted on the annular face thereof, which will be remote from the inner container, a circularly disposed heating coil 243, the ends of which are connected to lead in wires 268, in any suitable manner, and preferable so as to include in the circuit a visual signal 253, 254 installed in an annular cylindrical foot wall 269 forming part of the outer container 204 and extending beyond the bottom 205 thereof. The lead in wires 268 are connected severally to contact pins 246 the screw threaded shanks 245 of which pass through said foot wall 269 and may be secured in position by nuts 270. To protect the wires 268 and to provide at the same time securing means for the heater holder 266, the assembly preferably comprises a closure plate 271 having an internally threaded centrally disposed bush 272 into which a screw threaded end portion 264 of the stem 265 may be screwed. To prevent leakage through the joint between the stem 265 and the tubular support 263, I prefer to provide a compressible packing, such as a rubber washer 273, between the outer end of the support 263 and the adjacent end of the bush 271.

In order to enable the heater circuit to be automatically interrupted before the amount of liquid extractant remaining in the space 238 between the liner 260 and the inner container 219, has reached a predetermined low limit, I provide an automatic switch device 252, which may for instance be of the buoyancy responsive type, and which is to be understood as connected in the heater circuit in a manner which will be clear to those skilled in the art of electricity. Said automatic switch may conveniently be installed in a well 274 provided in the central portion of the heater holder 266. The packing 220 for the seal between the outer and inner containers, may be provided between the inner container 219 and the liner 260, as shown and preferably is so provided.

Figure 5:
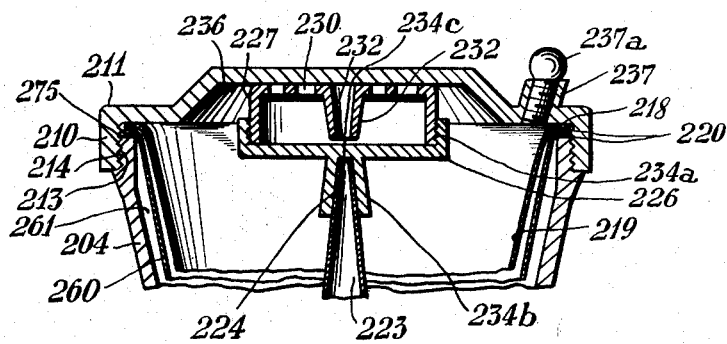
Fig. 5 is a fragmentary sectional view showing the upper portion of the embodiment of Fig. 4.

A further difference between the embodiment of Figs. 4 and 5 and those of Figs. 1 and 2, is in the construction of the means for containing the extractable material.

In Figs. 4 and 5 these means are shown as designed to be reversed so as to permit of the transporting in a bag or the like of the infusion device in fully prepared condition to be heated or utilized for preparing the infusion.

The screw closure 213, 214 will sufficiently provide closure of the inner container 219 to prevent spillage of any diluent which it may contain.

To seal off the reservoir and the space 238 and the interior of duct 223, the hollow supporting portion 232 has its hollow bore positively frustoconical to fit over an unstepped frustoconical end portion 224 of said duct 223.

The cap member 226 is adapted to be screwed on to the side wall 229 of the reservoir 227 as by screw threads 234a which likewise constitute the spacer means as already explained hereinabove, so that in this embodiment of Figs. 4 and 5 I dispense with other protuberances. It will be understood that the closure between cap 226 and reservoir 227 provided by the screw connection 234a is sufficient to prevent spilling or passage therethrough of any solid extractable material contained in the reservoir but still provides a sufficient controlled or restricted escape path for vapors when the device is in operation. To avoid too great a restriction of vapor escape I prefer to shorten the side wall 235 of the cap 226, and in order to offset any reduction in the directive effect on the escaping vapors, I arrange the height of the duct 223 so that the reservoir 227 and cap 226 may lie well within the inner container 219. This feature also enables me to keep the height of the infusion device as a whole to a reasonable size because in order to permit inversion of the extractable material container means as already indicated, I provide on the outside of top 234 of cap 226 a hollow frustoconical thimble member 234b having its larger diameter at the free end thereof and being of a length and size to fit slightly further down on the free end portion 224 than the supporting portion 232 of the reservoir 227.

Conveniently I provide at the narrow closed end of said thimble 234b a compressible packing member 234c to ensure liquidtight closure of the extremity of the free end portion 224 when the extractable material container means is inverted as seen in Fig. 5.

The thimble 234b likewise acts as a pressure receiving means to coact with a pressure transmitting surface 236 provided centrally in lid 211 to transmit sealing pressure to flange 218 through duct 223 when in the normal position of Fig. 4, whereas said surface 236 coacts with the foraminous end wall 230 of reservoir 227 to urge the thimble 234a against the free end portion 224 so as to press the packing member 234b against the extremity thereof to seal said duct 223 and thereby prevent escape of any extractant contained in space 238, and at the same time to transmit sealing pressure to flange 218 as before. In this embodiment the passage means for pouring is a spout 237 provided on lid 211 said passage means again communicating only with the interior of the inner container and being provided with a stopper 237a preferably a screw stopper to complete the closure of the housing for transport.

The use and operation of my infusion device will now be described with more particular reference to Fig. 1. If the device be supposed in dismantled condition, I first introduce into the outer container a suitable quantity of water, depending on the capacity of the device and the desired strength of the resultant infusion. I then locate the inner container 19 in the position shown, with the washer 20 between the flange 18 and the shelf 17. Alternatively, I may first locate the inner container in position in the outer container and pour the water for the outer container through the duct 23 of the inner container, which duct will, until the cap member 26 is put into its position, be open and readily accessible. Thus I do not require a separate special inlet for introducing water into the outer container.

Having positioned the inner container and introduced the charge of extractant into the outer container, I then locate on the end portion 24 of said duct 23, the reservoir 27 which may conveniently have been already filled with a charge of extractable material, such as ground coffee or fresh tea leaves, or may be filled with such a charge after being positioned on said end 24. Thereupon I position the cap 26 on the reservoir, and finally I close the outer container by applying the lid 11, with the quick thread portions 14 positioned to coincide with the unslotted portions of the upper wall 9, and then, when the skirt portion 13 of lid 11 has been pushed down into the mouth of the outer container defined by the upper wall 9, I twist said lid in order to engage said quick thread portions 14 in the slots 13 and thereby lock the lid in position and at the same time provide the gas tight seal between the inner and the outer containers as hereinabove described.

I then apply heat to the infusion device, as by standing the device of Fig. 1 on a suitable source of heat such, for example, as a gas ring, or in the case of the embodiments of Figs. 2 and 4, connecting the pins 143 or 243 to a suitable source of current. As the heating continues, the water or other extractant between the floor 22 and the bottom 5 and in the space 38 as well as in the interior of the duct 23 will gradually give off steam which will occupy the free room above the water level in the space 38 and in the duct 23. The steam in the space 38 will gradually build up pressure to depress the level of extractant in the space 38 and to raise the level thereof in the duct 23, while at the same time the steam formed in the duct 23 will ascend therein towards the cap member 26, and striking the domed top 34 will be deflected radially outwards thereby and enter the extractable material container through the gaps between pips 36 to warm up the extractable material, and will also escape through the narrow gap between the side wall 29 of the reservoir 27 and the depending wall 35 of the cap member 26 to enter the interior of the inner container and assist in preheating the inner container. If I have introduced into the inner container a charge of diluent, such as milk, said steam will act upon the exposed liquid surface thereof to preheat the same, and to fluidify any more viscous layer, such, for instance as cream, which may be upon said diluent. As the steam pressure rises in the space 38, extractant in liquid form will gradually be forced up the duct 23, until when the predetermined working pressure has been reached, the liquid extractant will be caused to overflow the duct 23 into the reservoir 27, and, like the steam in the earlier part of the operation, will be spread over the material to be extracted by the top 34 of the cap 26, said extractant then trickling through the extractable material and the infusion dripping into the inner container, where it will either collect as such or become mixed with the preheated diluent therein contained.

When the infusion has thus been prepared, the infusion device is removed from the source of heat, or in the case of Figs. 2 and 4, when the level of extractant has sunk to a predetermined value in the outer container, the electrical heater and the visual signal are automatically cut out as already indicated, and thereupon, the infusion may be poured out through the spout 37 without requiring uncovering or dismantling of the device. It will also be observed that, owing to the construction of the device, any liquid extractant remaining between the outer and inner containers, will be trapped therebetween and cannot be poured out with the prepared infusion to weaken the same, however much the device may be tilted in the pouring. Furthermore, the thermal insulation provided by the space 38, and, in the cases of Figs. 4 and 5 by the spaces 238 and 261 will keep the contents of the inner container hot for a very considerable time, especially if the device is stood on a good heat insulating support (not shown).

It should be observed that the construction illustrated in Fig. 4 is particularly suitable for the case when the outer container 204 is made of plastic material, especially plastic material which may have a tendency to become deformed or to soften when heated to temperatures corresponding to the boiling temperatures of the extractant. As may clearly be seen from said figures, the outer container is substantially completely protected from direct heating by the metal liner 260 and the air space 261 formed between said liner and the outer container. Thus another advantage of the present invention is that I may use comparatively inexpensive materials in constructing the infusion device, without thereby in any way detracting from its usefulness, efficiency and appearance.

It will also be noted that in all the embodiments illustrated the inner container, the annular packing therefor, and the extractable material containing means may be removed from the outer container and the outer container with its lid be used as a simple container or jug or for simply boiling or heating a liquid without making any infusion.

Also the supporting portion 232 of reservoir 227 and the free end portion 224 of duct 223 may be any suitable shape such as cylindrical, if suitable stop means or shoulders are provided and the supporting portion may be dimensioned for insertion in said end portion.

It is furthermore to be understood that the means for coupling the lid 11 to the outer container 4, need not be of the quick or ordinary screw type, provided that they are readily releasable and that they are adapted to prevent unintentional displacement of said lid away from the closed end of the outer container, when the lid is in coupled position thereon. In other words the coupling means must be such that the lid may be brought into a position on the outer container and positively held in such position, in which the pressure transmitting surface or surfaces of the lid may cause the flange of the inner container to be urged towards the annular supporting surface of the outer container, to there establish the gas-tight seal. It should further be understood that I am not concerned with merely providing a gas-tight seal in the infusion device by pressure transmitted by the lid, but that this feature of my invention consists in the provision between an outer container and an inner container suspended in the outer container from an annular supporting surface structurally related to the outer container, of a gas-tight seal over the whole area of suspension, by pressure transmitted to the inner container by the lid.

Although I have described my novel infusion device with particular reference to certain preferred embodiments thereof, I do not intend to be limited thereby, but may make such modifications and changes therein as lie within the scope of the accompanying claims.

I claim:

1. An infusion device comprising an outer container having a closed end and an open mouth, a movable lid for closing said open mouth to thereby define with said outer container a substantially closed housing, an inner container including a surrounding wall, an open end, an outwardly directed annular flange adjacent said open end, an annular floor at the end of the inner container remote from said open end, a tubular duct extending from said annular floor towards said open end, said duct including a free end portion, said outer container having an annular supporting surface comprised within said housing and of a size to support said annular flange, said inner container being of a size to be entirely enclosed in said housing and to be suspended in said outer container when said annular flange is supported by said supporting surface, a reservoir member comprising an annular foraminous end wall, a side wall extending from one side of said end wall, a hollow supporting portion extending centrally from said end wall on the same side thereof as said side wall, said supporting portion being of a size to be received by said free end portion of said duct, a cap member comprising an imperforate top and an imperforate depending side wall of a size to fit over the side wall of said reservoir, a plurality of protuberances projecting from said top on the same side thereof as said depending side wall said protuberances being arranged in mutually spaced relationship and to engage the side wall of said reservoir, whereby to provide gaps of predetermined dimensions when said cap is located on said reservoir for controlled passage of vapor from said reservoir, a compressible annular packing member of a size to fit between said supporting surface and said annular flange, releasable coupling means for coupling said lid to said outer container to close said outer container and prevent unintentional displacement of said lid away from said closed end, pressure transmitting surfaces on said lid for transmitting pressure to at least said annular flange to urge said flange towards said supporting surface to there establish a substantially gas-tight joint between said outer container and said inner container and passage means in said housing for communicating the interior of said inner container with the atmosphere.

2. An infusion device comprising an outer container having an upper cylindrical wall portion defining a closed end and an open mouth, a movable lid for closing said open mouth, to thereby define with said outer container a substantially closed housing, an inner container including a surrounding wall, an open end, an outwardly directed annular flange adjacent said open end, an annular floor at the end of the inner container remote from said open end, a tubular duct extending from said annular floor towards said open end, said duct including a hollow frustoconical free end portion, an annular ledge extending inwardly of said outer container and located adjacent said upper wall portion and comprised within said housing and of a size to support said annular flange, said inner container being of a size to be entirely enclosed in said housing and to be suspended in said outer container when said annular flange is supported by said supporting surface, a reservoir member comprising an annular foraminous end wall, a side wall extending from one side of said end wall, a hollow frustoconical supporting portion extending centrally from said end wall on the same side thereof as said side wall, said supporting portion being of a size to be received by said free end portion of said duct, a cap member comprising an imperforate top and an imperforate depending side wall of a size to fit over the side wall of said reservoir, a plurality of protuberances projecting from said top on the same side thereof as said depending side wall said protuberances, being arranged in mutually spaced relationship and to engage the side wall of said reservoir, whereby to provide gaps of predetermined dimensions when said cap is located on said reservoir for controlled passage of vapor from said reservoir, said depending side wall extending over said side wall of said reservoir a sufficient distance to direct escaping vapor into said inner container towards said annular floor, a compressible annular packing member of a size to fit between said supporting surface and said annular flange, releasable coupling means for coupling said lid to said outer container to close said outer container and prevent unintentional displacement of said lid away from said closed end, pressure transmitting surfaces on said lid for transmitting pressure to at least said annular flange to urge said flange towards said supporting surface to there establish a substantially gas-tight joint between said outer container and said inner container and passage means in said housing for communicating the interior of said inner container with the atmosphere.

3. An infusion device comprising an outer container having an upper cylindrical wall portion defining a closed end and an open mouth, a movable lid for closing said open mouth to thereby define with said outer container a substantially closed housing, an inner container including a surrounding wall, an open end, an outwardly directed annular flange adjacent said open end, an annular floor at the end of the inner container remote from said open end, a tubular duct extending from said annular floor towards said open end, said duct including a hollow frustoconical free end portion, an annular ledge extending inwardly of said outer container and located adjacent said upper wall portion and comprised within said housing and of a size to support said annular flange, said inner container being of a size to be entirely enclosed in said housing and to be suspended in said outer container when said annular flange is supported by said supporting surface, a reservoir member comprising an annular foraminous end wall, a side wall extending from one side of said end wall, a hollow frustoconical supporting portion extending centrally from said end wall on the same side thereof as said side wall, said supporting portion being of a size to be received by said free end portion of said duct member, a plurality of protuberances projecting from said top on the same side thereof as said imperforate side wall, said protuberances being so disposed that when said cap member is applied to said reservoir member, said protuberances will rest on said end portion of said duct, a lid having a depending skirt portion of a size to engage said upper wall portion of said outer container, and thereby define a substantially closed housing, said inner container being of a size to be entirely in said housing when said flange is supported on said ledge, rotary type coupling means for coupling said skirt portion to said upper wall portion, said upper wall portion including a spout portion, handle means on the side of said lid remote from said skirt, protuberant areas projecting from said lid on the same side thereof as said skirt portion, and passage means in said housing for communicating the interior of said inner container with atmosphere, whereby when the inner container is located in the outer container with said flange engaging said packing member located on said ledge, and with the reservoir member mounted on said free end portion and said cap member in position over said reservoir member, said skirt portion of said lid may be caused to engage said upper wall portion and to be coupled thereto by said rotary means to substantially close said device and to cause said protuberant areas to exert pressure on said cap member to thereby through said reservoir member and said duct urge said flange towards said ledge to compress said packing and thereby establish a substantially gas-tight seal between said flange and said ledge.

4. An infusion device comprising an outer container having an upper cylindrical wall portion defining a closed end and an open mouth, a movable lid for closing said open mouth to thereby define with said outer container a substantially closed housing, an inner container including a surrounding wall, an open end, an outwardly directed annular flange adjacent said open end, an annular floor at the end of the inner container remote from said open end, a tubular duct extending from said annular floor towards said open end, said duct including a hollow frustoconical free end portion having a large end adjacent said duct, an annular ledge extending inwardly of said outer container and located adjacent said upper wall portion and comprised within said housing and of a size to support said annular flange, said inner container being of a size to be entirely enclosed in said housing and to be suspended in said outer container when said annular flange is supported by said supporting surface, a reservoir member comprising an annular foraminous end wall, a side wall extending from one side of said end wall, a hollow frustoconical supporting portion extending centrally from said end wall on the same side thereof as said side wall, said supporting portion being of a size to be received by said free end portion of said duct member, a plurality of protuberances projecting from said top on the same side thereof as said imperforate side wall, said protuberances being so disposed that when said cap member is applied to said reservoir member, said protuberances will rest on said end portion of said duct, a lid having a depending skirt portion of a size to engage said upper wall portion of said outer container, and thereby define a substantially closed housing, said inner container being of a size to be entirely in said housing when said flange is supported on said ledge, rotary type coupling means for coupling said skirt portion to said upper wall portion, said upper wall portion including a spout portion, handle means on the side of said lid remote from said skirt, protuberant areas projecting from said lid on the same side thereof as said skirt portion, and passage means in said housing for communicating the interior of said inner container with atmosphere, whereby when the inner container is located in the outer container with said flange engaging said packing member located on said ledge, and with the reservoir member mounted on said free end portion and said cap member in position over said reservoir member, said skirt portion of said lid may be caused to engage said upper wall portion and to be coupled thereto by said rotary means to substantially close said device and to cause said protuberant areas to exert pressure on said cap member to thereby through said reservoir member and said duct urge said flange towards said ledge to compress said packing and to urge said supporting portion into intimate contact with said free end portion, to thereby establish a substantially gas-tight seal between the outer container and the inner container at said annular supporting surface and between said free end portion and said supporting portion.

5. An infusion device comprising an outer container having a closed end and a substantially cylindrical upper wall portion at the other end of said outer container defining an open mouth, an annular ledge on the inside of said outer container adjacent said upper wall portion, an annular compressible packing member on said ledge on the side thereof adjacent said upper wall portion, an inner container including a surrounding wall, an outwardly directed flange defining an open end of said inner container and resting on said packing member, an annular floor at the end of said inner container remote from said open end, a tubular duct extending from said annular floor towards said open end, said duct including a frustoconical free end portion having a large end adjacent said duct, a reservoir member comprising an annular foraminous end wall, a side wall extending from one side of said end wall and a hollow frustoconical supporting portion extending centrally from said annular end wall and having a large end merging in said end wall, and a free small end, said frustoconical supporting portion being mounted on said free end portion to support said reservoir on said duct, a cap member comprising an imperforate top and an imperforate depending side wall, a plurality of protuberances projecting from said top on the same side thereof as said depending side wall said protuberances being arranged in mutually spaced relationship and resting on said free small end, said depending side wall extending towards the annular floor of the inner container, spacing means arranged between said cap member and said reservoir to define gaps for restricted escape of vapors from said reservoir into said inner container and towards said annular floor, a movable lid for closing the open mouth of said outer container, to thereby define a substantially closed housing wholly enclosing the inner container, releasable coupling means for coupling said lid to said outer container in closed position and for preventing unintentional displacement of said lid away from said closed end, a plurality of projections on said lid arranged to contact said cap member and to thereby transmit pressure through said protuberances and said supporting member to said duct to thereby establish a substantially gas-tight seal between said flange and said supporting surface and between said supporting member and said free end portion, and passage means in said housing for communicating the interior of said inner container with atmosphere.

6. An infusion device comprising an outer container having a closed end and a substantially cylindrical wall portion at the other end of said outer container, defining an open mouth, an annular ledge on the inside of said outer container between said cylindrical wall and said closed end, an annular compressible packing member resting on said annular ledge, an inner container including a surrounding wall, an outwardly directed annular flange defining an open end of said inner container and resting on said annular packing member, an annular floor at the end of said inner container remote from said open end, a tubular duct extending from said annular floor towards said open end, said duct including a frustoconical free end portion having a large end adjacent said duct, a reservoir member comprising an annular foraminous end wall, a side wall extending from one side of said end wall and a hollow frustoconical supporting portion extending centrally from said annular end wall and having a large end merging in said end wall, and a free small end, said frustoconical supporting portion being mounted on said free end portion to support said reservoir on said duct, a cap member comprising an imperforate top and an imperforate depending side wall, a plurality of protuberances projecting from said top on the same side thereof as said depending side wall said protuberances being arranged in mutually spaced relationship and resting on said free small end, said depending side wall extending towards the annular floor of the inner container, spacing means arranged between said cap member and said reservoir to define gaps for restricted escape of vapors from said reservoir into said inner container and towards said annular floor, a movable lid including a substantially cylindrical skirt portion of a size to be received in said cylindrical wall portion of the outer container for closing said outer container to thereby define a substantially closed housing wholly enclosing said inner container, quick thread screw type coupling means on said skirt portion and on said cylindrical wall portion for coupling said lid to said outer container and preventing unintentional displacement of said lid from said closed end, a plurality of projections on said lid on the same side thereof as said skirt portion, said projections being arranged to contact said cap member in the fully closed position of the lid to thereby transmit sealing pressure through said protuberances said supporting member and said free end portion to said annular flange and to said supporting member, and a spout formed in said cylindrical wall portion for communicating the interior of said inner container with atmosphere.

References Cited in the file of this patent

UNITED STATES PATENTS

| Number | Name | Date |
|---|---|---|
| Re. 19,566 | Valls | May 7, 1935 |
| 60,204 | Lee | Dec. 4, 1866 |
| 1,158,421 | Abtmeyer | Nov. 2, 1915 |
| 1,171,022 | Ciletti | Feb. 8, 1916 |
| 1,809,294 | Guerin et al. | June 9, 1931 |
| 2,046,710 | Umstott | July 7, 1936 |
| 2,169,880 | McNeil | Aug. 15, 1939 |
| 2,256,664 | Burke | Sept. 23, 1941 |
| 2,269,112 | Jepson et al. | Jan. 6, 1942 |
| 2,515,385 | Wales | July 18, 1950 |
| 2,550,902 | Beckelman | May 1, 1951 |
| 2,565,638 | Victory | Aug. 28, 1951 |

FOREIGN PATENTS

| Number | Country | Date |
|---|---|---|
| 533,478 | France | Dec. 10, 1921 |
| 703,612 | Germany | Mar. 12, 1941 |
| 965,892 | France | Feb. 22, 1950 |